(12) United States Patent
Cheung et al.

(10) Patent No.: US 9,977,660 B2
(45) Date of Patent: May 22, 2018

(54) METHOD OF CONTROLLING AND MANAGING ELECTRONIC DEVICE AND CONTROL SYSTEM USING SAME

(71) Applicant: ABLE WORLD INTERNATIONAL LIMITED, Virgin Islands, British (VG)

(72) Inventors: Wai-Tung Cheung, Hong Kong (HK); Chun-Hsiao Lin, New Taipei (TW); Shih-Cheng Lan, Taipei (TW); Ho-Cheung Cheung, Hong Kong (HK)

(73) Assignee: ABLE WORLD INTERNATIONAL LIMITED, Virgin Islands (VG)

( * ) Notice: Subject to any disclaimer, the term of this patent is extended or adjusted under 35 U.S.C. 154(b) by 30 days.

(21) Appl. No.: 15/318,817

(22) PCT Filed: Jun. 29, 2015

(86) PCT No.: PCT/CN2015/082688
§ 371 (c)(1),
(2) Date: Dec. 14, 2016

(87) PCT Pub. No.: WO2016/000594
PCT Pub. Date: Jan. 7, 2016

(65) Prior Publication Data
US 2017/0147366 A1 May 25, 2017

Related U.S. Application Data

(63) Continuation of application No. 14/324,069, filed on Jul. 3, 2014, now Pat. No. 9,134,963, and a (Continued)

(30) Foreign Application Priority Data

Feb. 5, 2015 (CN) .......................... 2015 1 0061132

(51) Int. Cl.
*G06F 9/44* (2018.01)
*G06F 3/00* (2006.01)

(52) U.S. Cl.
CPC .................. *G06F 8/35* (2013.01); *G06F 8/30* (2013.01); *G06F 9/4411* (2013.01)

(58) Field of Classification Search
CPC ..... G06F 8/20; G06F 8/30; G06F 8/35; G06F 9/4411; G06F 9/4445; G06F 17/30864; G06F 17/30876
(Continued)

(56) References Cited

U.S. PATENT DOCUMENTS 6,437,803 B1 * 8/2002 Panasyuk .............. G06F 9/4443
715/733
2002/0054084 A1 5/2002 Udell
(Continued)

FOREIGN PATENT DOCUMENTS

| CN | 202750149 U | 2/2013 |
|---|---|---|
| CN | 103023681 A | 4/2013 |
| WO | WO03067427 A2 | 8/2003 |

*Primary Examiner* — Qing Chen
(74) *Attorney, Agent, or Firm* — WPAT, PC

(57) ABSTRACT

In a method of controlling and managing an electronic device, which is executed by at least one control device to control and manage at least one electronic device, a projectable space instance is provided for each the at least one control device to create a workspace, wherein at least one unified tool for driving the at least one electronic device is selectively added to the projectable space instance. The projectable space instance is then parsed with a projector by the corresponding control device to automatically generate a projected workspace corresponding to the workspace to be created via the projectable space instance, wherein the at least one unified tool drives the at least one electronic device to execute at least one task in response to an operation on the corresponding control device.

16 Claims, 15 Drawing Sheets

Related U.S. Application Data continuation of application No. 14/325,466, filed on Jul. 8, 2014, now Pat. No. 9,727,391, and a continuation of application No. 14/577,772, filed on Dec. 19, 2014, now Pat. No. 9,626,157.

(58) Field of Classification Search
USPC .................. 717/100, 104–106; 719/321–327
See application file for complete search history.

(56) References Cited

U.S. PATENT DOCUMENTS

| | | |
|---|---|---|
| 2004/0001095 A1 | 1/2004 | Marques |
| 2005/0120349 A1* | 6/2005 | Wright ................... G06F 3/038 718/102 |
| 2005/0151835 A1* | 7/2005 | Guo ....................... H04N 7/147 348/14.08 |
| 2007/0055941 A1* | 3/2007 | Bhakta ................... G06F 3/1454 715/739 |
| 2007/0113066 A1 | 5/2007 | Samba et al. |
| 2007/0124374 A1* | 5/2007 | Arun ...................... G06Q 10/10 709/204 |
| 2009/0006553 A1* | 1/2009 | Grandhi ............ G06F 17/30171 709/205 |
| 2010/0191352 A1 | 7/2010 | Quail |
| 2010/0205528 A1 | 8/2010 | Bavor et al. |
| 2010/0313199 A1* | 12/2010 | Chen .................... G06F 9/5055 717/177 |
| 2011/0197147 A1* | 8/2011 | Fai ........................ G06F 1/1639 715/753 |
| 2012/0021684 A1 | 1/2012 | Schultz et al. |
| 2012/0054640 A1* | 3/2012 | Nancke-Krogh ..... G06F 9/4843 715/751 |
| 2012/0060204 A1* | 3/2012 | Panasyuk ................ G06F 21/31 726/3 |
| 2012/0151373 A1 | 6/2012 | Kominac et al. |
| 2014/0172799 A1 | 6/2014 | Dorman |

* cited by examiner

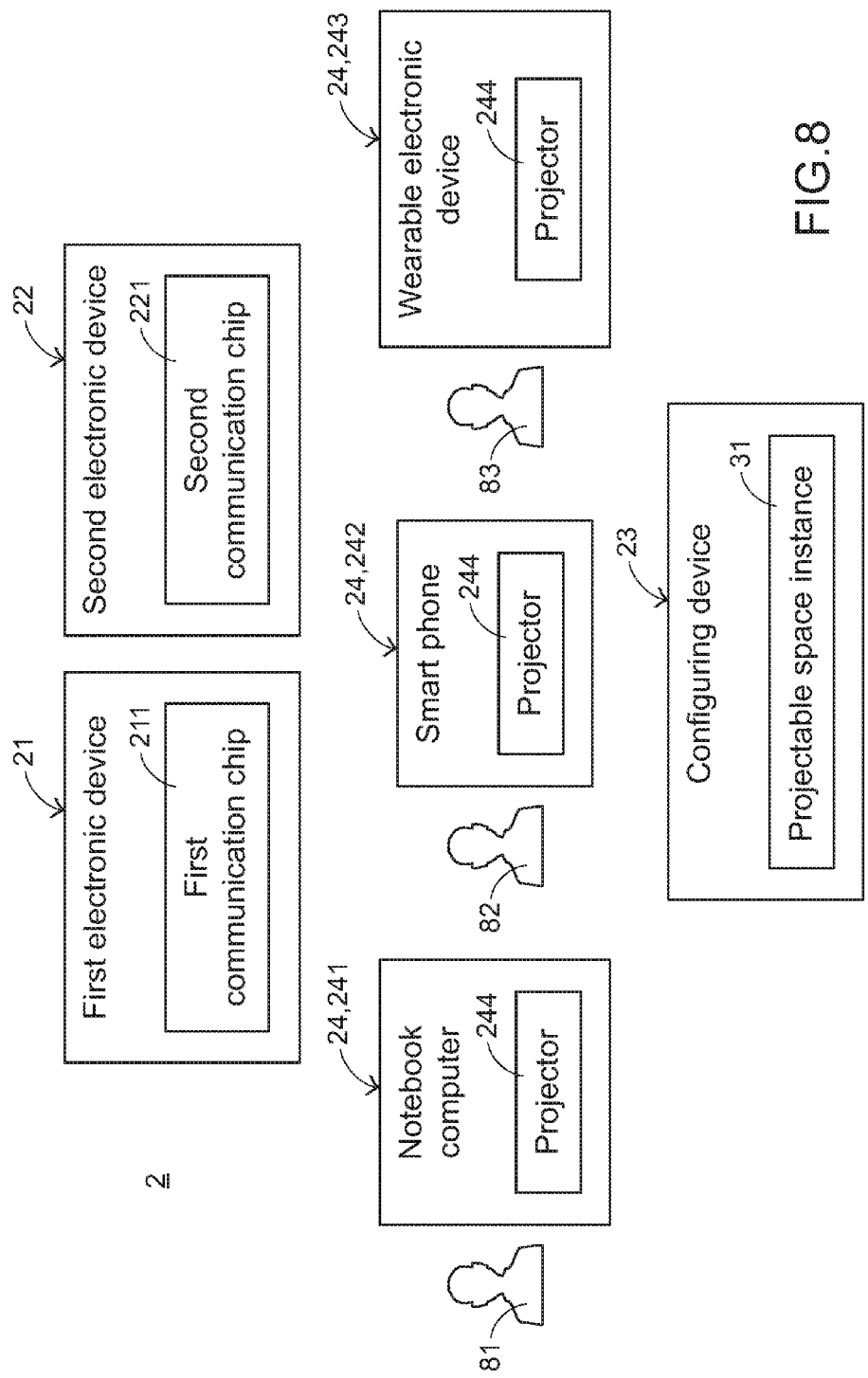

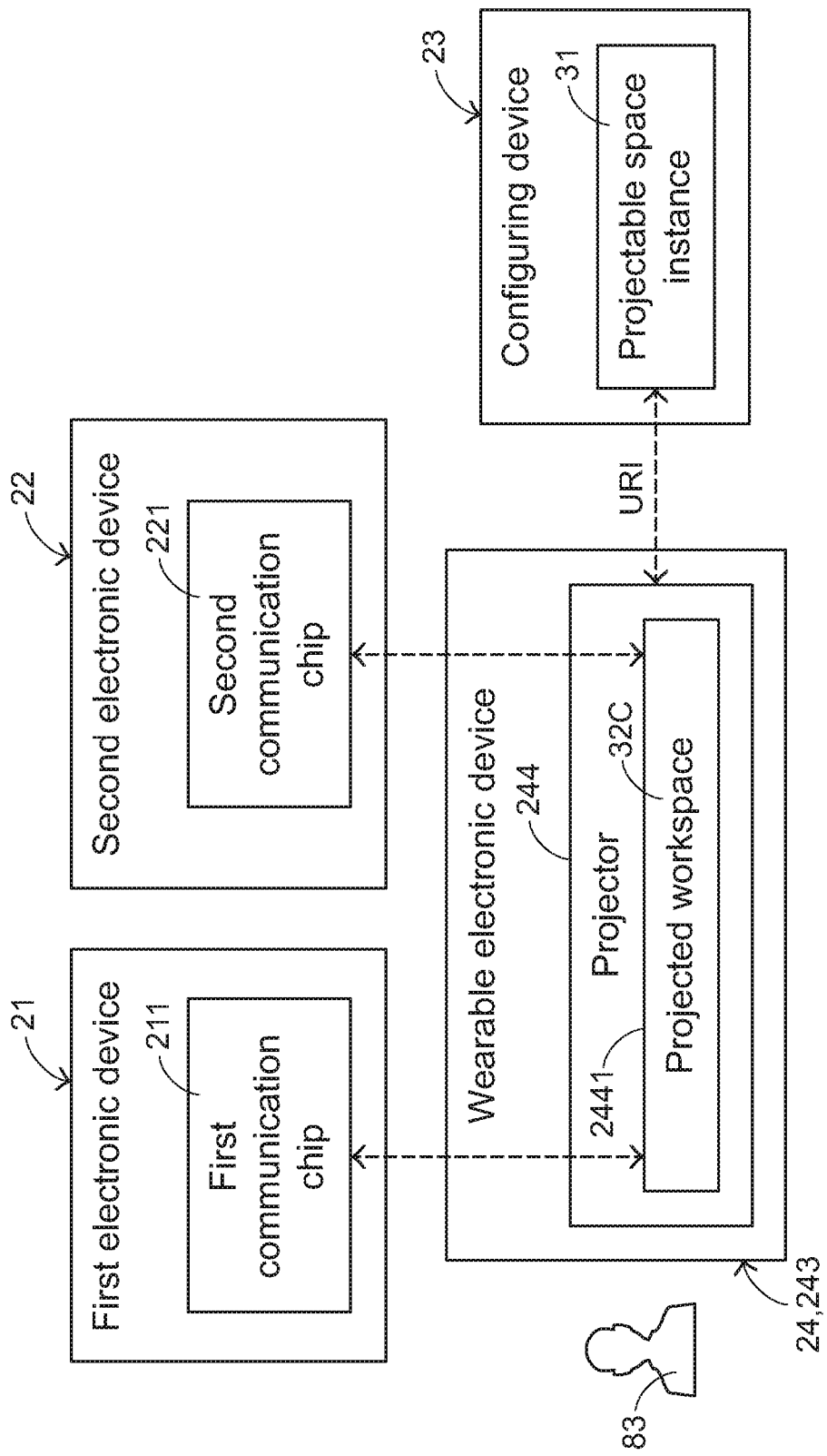

METHOD OF CONTROLLING AND MANAGING ELECTRONIC DEVICE AND CONTROL SYSTEM USING SAME

TECHNICAL FIELD

The present invention relates to a control and management method, and particularly to a method of controlling and managing an electronic device by way of a workspace. The preset invention also relates to a control system using the control and management method.

BACKGROUND

As information and communications technology improves every day, building an informationized, digitized, human-centered and facilitative smart life has become a trend in the future. Meanwhile, home appliances that are parts of our daily lives would become keys to digital homes and smart lives for sure. Hence, the development of intelligentized home appliances would be one of the mainstreams in industry.

Smart home appliances generally refer to consumer electronics and home appliances with ability to link to internet, including wide area service network, local area home network, or any other suitable network. Home appliances interconnected via internet and integrated as a system can be used to build up digital homes and smart lives.

For integrating and communicating home appliances with one another, different types of home appliances, home appliances produced by different designers or manufacturers and/or home appliances performing different functions are linked through a unified communication protocol. For example, Qualcomm Technologies, Inc. (hereinafter "Qualcomm") has developed a communication chip based on the AllJoyn open software architecture. Home appliances installed with the communication chip are then able to communicate and interact with one another through the AllJoyn platform. In addition, several corporations including Microsoft, Philips and Sony have established another communication protocol, Digital Living Network Alliance (DLNA), for communication and interaction among home appliances. Green Energy & Environment Research Laboratories of Industrial Technology Research Institute (Taiwan) further provides a SAANet control protocol available to home appliance manufacturers. Therefore, a user can control and manage all the home appliances sharing a common communication protocol and linking to a common network and acquire information from these home appliances. Meanwhile, the home appliances are able to communicate and interact with one another under the common communication protocol. However, since home appliance manufacturers may be in a competitive relationship to one another, it might be hard to coordinate the home appliance manufacturers to accept a common communication protocol or use a common communication chip under consideration of commercial profits.

Furthermore, there would always be new communication protocols developed for new or existing home appliances in the future. The new communication protocols might be unable to communicate with one other or with the existing ones. Under this circumstance, home appliances using communication chips developed based on new communication protocols would be unable to communicate and interact with other home appliances. This might cause problems in use. Therefore, an operating environment which is so flexible that a new communication protocol can be added to the control device easily and compatibly, and any undesired communication protocol can be removed from the control device at any time, is required.

Moreover, although it is simple to integrally control and manage all these home appliances with a single control device, it might be inconvenient and inflexible to use the single control device when more than one user would like to use the control device or the control device is not at an available place to the user. For instance, when a user would like to control a television at the living room, but the control device is now in the bedroom, he has to walk into the bedroom to get the control device first.

SUMMARY

Therefore, an object of the present invention is to provide a control and management method and a control system, by which electronic devices developed based on the same or different communication protocols can be driven by the same control device, or by a plurality of control devices sharing control rule settings and/or control interfaces. The control and management method and system according to the present invention can be operated by one or more users to control and manage the electronic devices conveniently and efficiently.

In an aspect, the present invention provides a method of controlling and managing an electronic device, executed by at least one control device to control and manage at least one electronic device, the method comprising: providing a projectable space instance for each the at least one control device to create a workspace, wherein at least one unified tool for driving the at least one electronic device is selectively added to the projectable space instance; and parsing the projectable space instance with a projector by the corresponding control device to automatically generate a projected workspace corresponding to the workspace to be created via the projectable space instance, wherein the at least one unified tool drives the at least one electronic device to execute at least one task in response to an operation on the corresponding control device.

In another aspect, the present invention provides a control system, comprising: at least one electronic device; and at least one control device, each using a projector to parse a projectable space instance to build a projected workspace corresponding to a workspace to be created via the projectable space instance, wherein at least one unified tool for driving the at least one electronic device is selectively added to the projectable space instance, and the at least one unified tool drives the at least one electronic device to execute at least one task in response to an operation on the corresponding control device.

In an embodiment, the at least one unified tool includes at least one unified device driver generated by unifying at least one device driver.

In an embodiment, the at least one device driver is developed by way of a software development kit (SDK) corresponding to the at least one electronic device.

In an embodiment, the at least one unified tool includes a plurality of unified device drivers generated by unifying a plurality of device drivers for driving a plurality of electronic devices, respectively, wherein the plurality of device drivers are configured in the projected workspace after being unified, so as to be compatible with one another.

In an embodiment, the method is used for controlling and managing a home appliance system, a medical equipment system, a security control system, a fire-fighting control system or a transportation control system.

In an embodiment, the projectable space instance is loaded via a uniform resource identifier (URI) to be provided for the corresponding control device.

In an embodiment, the at least one control device is selected from a computer, a home appliance, a handheld electronic device, a wearable electronic device or a combination thereof.

In an embodiment, one of the at least one control device controls and manages at least two different types of electronic devices.

In an embodiment, the at least two different types of electronic devices are manufactured by different manufacturers, exhibit different functions, or are manufactured by different manufacturers and exhibit different functions.

In an embodiment, the projectable space instance is an object, an XML document, or an instance which is instantiated with a structured language or a structured protocol.

In an embodiment, the projector is built in the corresponding control device, or loaded to the corresponding control device.

BRIEF DESCRIPTION OF THE DRAWINGS

The above objects and advantages of the present invention will become more readily apparent to those ordinarily skilled in the art after reviewing the following detailed description and accompanying drawings, in which:

FIG. 8 is a schematic block diagram exemplifying an initial state of a control system according to an embodiment of the present invention;

FIG. 9C is a scheme exemplifying operation of the control system of FIG. 8, wherein two electronic devices are controlled and managed with a wearable electronic device;

DETAILED DESCRIPTION

The present invention can be readily appreciated by referring to the following descriptions, including the following glossary of terms and the concluding examples. It is to be noted that some patent publication numbers or patent application numbers are cited throughout the specification, and the entire disclosures thereof are to be incorporated herein for reference.

In the embodiments described below, the present invention is described by way of examples and characteristic illustrations, but is not to be limited to the examples and characteristic illustrations. The term "information source" used herein indicates a symbolic sequence of useful information that can be specifically interpreted as, but not limited to, a message for organizing and labeling data. The information source includes a website (such as internet service), intranet, software, electronic book, database and other media of information (such as storage media of non-transitory computer or storage media of mobile device). The term "original information" used herein indicates, but is not limited to, a file, web page, database row, policy, rule or any information accessible from corresponding machine or server. The term "tool" used herein indicates, but is not limited to, a utility, widget, agent, application, service or any executable element accessible from corresponding machine or server.

Furthermore, the "original information" and the "original tool" are embodiments of the "original matter" in the present invention. By way of a unifying method, multiple "original matters" from the same or different "information sources" are modelled into multiple "unified matters". The resulting "unified matters" existing in the same working environment are then compatible with one another and capable of conducting cooperative task. Moreover, the "unified tool" and the "unified information unit" are embodiments of the "unified matter" in the present invention. The term "matterizer" used herein indicates a component, device or program code for unifying the "original matter".

In a preferred embodiment, the unifying method mentioned above includes steps of reorganizing at least one original information obtained from at least one of the multiple information sources based on a unified data structure, thereby modeling the original information into a unified information unit; and/or reorganizing at least one original tool obtained from at least one of the multiple information sources based on another unified data structure, thereby modeling the original tool into a unified tool. The unified data structure and the another unified data structure may be the same or different. The unifying method can be implemented with a matterizer.

Figure 1:
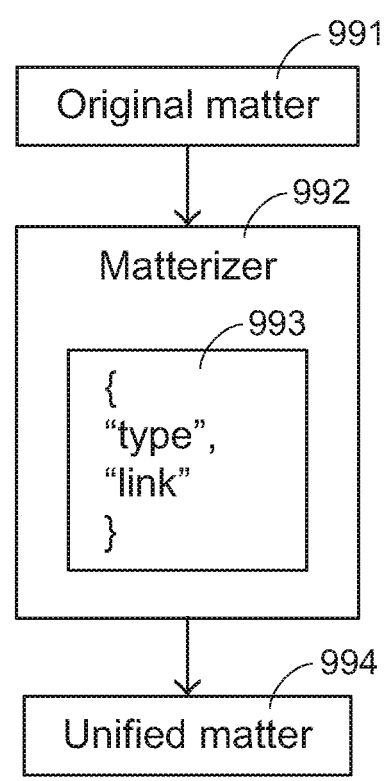
FIG. 1 is a scheme showing a unifying method, which is applicable to the present invention for controlling and managing an electronic device.

Please refer to FIG. 1, which is a scheme showing a unifying method, which is applicable to the present invention for controlling and managing an electronic device. As shown in FIG. 1, a matterizer 992 reorganizes an attribute and an associated link of an original matter 991 based on a unified data model 993, thereby modeling the original matter 991 into a unified matter 994. The resulting basic attribute of the unified matter 994 then includes a type and a link of the original matter 991.

In this embodiment, the original matter 991 could be, but is not limited to an original information and/or an original tool. In the above mentioned unifying method, if the attribute accessible from the original information complies with the attribute requirement of the unified information unit, the unified information unit can be directly generated through the matterizer 992. On the other hand, if the attribute accessible from the original information does not comply with the attribute requirement of the unified information unit, a process of logically reorganizing the attribute and the associated link of the original information to redefine the original information is needed, in order to transform the original information into a new original information with an attribute consistent to the attribute requirement of the unified information unit. Under this circumstance, the unified information unit is indirectly generated.

Furthermore, the unified tool is directly generated through the matterizer 992 when the original tool is compatible with the working environment of the workspace; and an adapter and/or a software development kit (SDK) for driving the original tool would be required as a medium for generating the unified tool, i.e. indirectly, when the original tool is incompatible with the working environment of the workspace. In other words, the adapter is used to provide an interface implementation to fit the working environment.

The details of the embodiments of unifying method, the acquisition of the unified matters and the operation of the matterizer according to the present invention can be understood with reference to, but not limited to, the U.S. patent application Ser. No. 14/324,069, entitled "A method of unifying information and tool from a plurality of information sources" as well as the China Patent Application No. 201410768564.X, which claims the benefit of priority to the U.S. patent application Ser. No. 14/324,069 and is entitled "A method of unifying information and tool from a plurality of information sources and computer product and device using the method", which are assigned to the same assignee. The entire disclosures of the co-pending patent applications are incorporated herein for reference, and would not be redundantly described. Furthermore, those skilled in the art may make equivalent modifications according to practical requirements.

Hereinafter, two more examples of unifying methods applicable to the present invention are given as follows. The first one is an information unifying method applied to Garmin satellite navigation. Similar to above-mentioned unifying method, a unified point information (regarded as the unified information unit of the present invention) corresponding to an original point information (regarded as the original information of the present invention) is obtained after a unifying process is performed on the original point information by executing the Point of Interest (POI) function of Garmin satellite navigation. The second one is a tool unifying method applied to an Android system. An Android system is an open source mobile operating system based on Linux. In general, application programs (regarded as the original tool of the present invention) of Android systems are written in Java. Therefore, application programs (regarded as the original tool of the present invention) written in Java can be modeled into unified applications (regarded as the unified tool of the present invention) compatible with the Android system. The resulting unified application programs corresponding to the application programs written in Java are then executable in the Android system.

The workspace described herein is a space where at least one matterizer, at least one information and/or at least one tool can interact with one another and/or execute specified tasks. The at least one information and/or at least one tool can be, but is not limited to be, imported into the workspace through the at least one matterizer. Information importers 9881, 9882 and 9883 to be described later with reference to FIG. 5 are exemplified embodiments of the matterizer. The unified script described herein is an intermediate language for implementing the workspace, and the at least one matterizer, the at least one information and/or the at least one tool are provided, for example built-in or plugged-in, to the workspace by way of the unified script.

In an embodiment, the above-mentioned at least one information is a unified information unit which is generated after at least one original information obtained from at least one information source is unified. The above-mentioned at least one tool is a unified tool which is generated after at least one original tool obtained from at least one information source is unified. Any user could add, build or plug any unified information unit he needs and/or unified tool he needs from corresponding information sources into a personal workspace according to practical needs. In other words, the workspace can be a user-oriented personal workspace.

Figure 2:
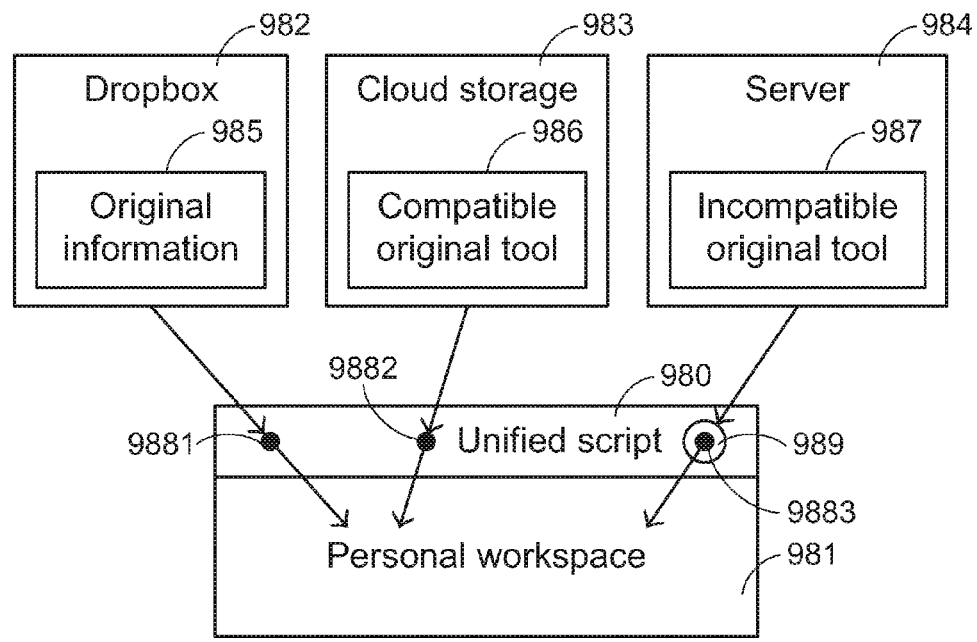
FIG. 2 is a scheme illustrating implementation of a personal workspace with a unified script used as an intermediate language.
Figure 3:
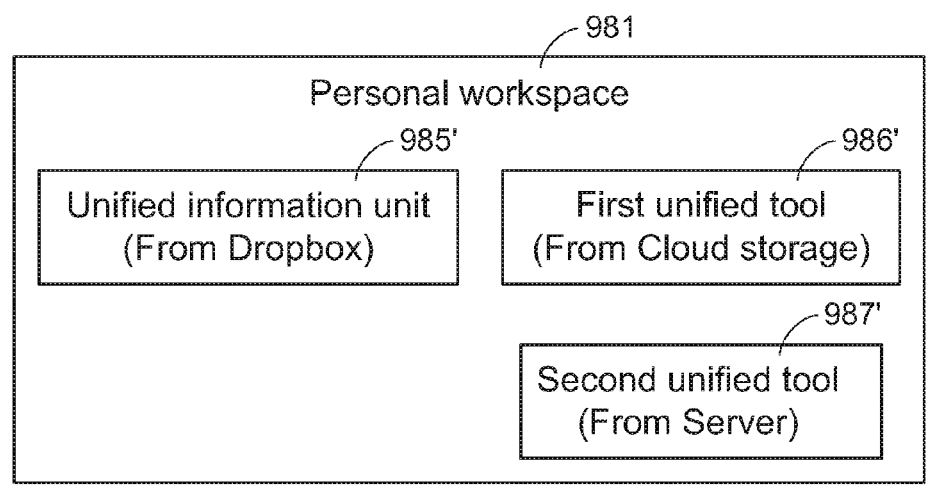
FIG. 3 is a schematic block diagram exemplifying allocation of unified matters in a personal workspace, which is applicable to the present invention for controlling and managing an electronic device.

Please refer to FIG. 2 and FIG. 3, FIG. 2 schematically illustrates an implementation concept of using the unified script as an intermediate language for implementing the workspace, and FIG. 3 schematically illustrates an exemplified configuration of a personal workspace. As shown in FIG. 2 and FIG. 3, a unified information unit 985' corresponding to an original information 985 in the Dropbox 982, a first unified tool 986' corresponding to a compatible original tool 986 in the cloud storage 983 and a second unified tool 987' corresponding to an incompatible original tool 987 in a server 984 are selectively combined into a personal workspace 981 by a user. This can be accomplished by compiling a unified script 980 and configuring an information importer 9881 of Dropbox 982, an information importer 9882 of the cloud storage 983 and an information importer 9883 of the server 984 according to the unified script 980. Accordingly, the original information 985 in the Dropbox 982 can be unified into the unified information unit 985' and then imported into the personal workspace 981. For example without limitation, the unified script 980 is defined as an intermediate language for implementing the workspace, and the information importer 9882 is a matterizer of Dropbox.

As shown in FIG. 2 and FIG. 3, the original tool saved in the cloud storage 983 is a compatible original tool 986 which is compatible with the component architecture of the unified tool of the personal workspace 981. The first unified tool 986' corresponding to the compatible original tool 986 is directly provided to the personal workspace 981 through the information importer 9882 of the unified script 980.

On the other hand, the original tool saved in the server 984 is the incompatible original tool 987 which is incompatible with the component architecture of the unified tool of the personal workspace 981. Then the second unified tool 987' corresponding to the incompatible original tool 987 is indirectly provided to the personal workspace 981 through a compatible adaptor 989 and the information importer 9883 of the unified script 980.

FIG. 3 further shows that the unified information unit 985', the first unified tool 986' and the second unified tool 987' are flexibly configured and arranged, e.g. grouped or placed, by the user in a specified region of the personal workspace 981 according to practical needs. Afterwards, the user may use the unified tool to do what he wants to do, for example, to access and control the corresponding unified information unit by way of operations between the unified tool and the unified information unit, such as clicking or dragging.

The specific descriptions of using the unified script as the intermediate language for implementing the workspace and selectively combining unified information unit and unified tool from corresponding information sources into the personal workspace to perform tasks according to practical needs, as mentioned in the embodiments, can also be referred to a co-pending U.S. patent application Ser. No. 14/325,466, entitled "A method of combining unified matters in personal workspace", as well as the China Patent Application No. 201410796528.4, which claims the benefit of priority to the U.S. patent application Ser. Nos. 14/324, 069 and 14/325,466 and is entitled "A method of combining unified matters in a personal workspace and computer product and device using the method", which are assigned to the same assignee, and will not be redundantly described herein.

The personal workspace mentioned above is just an embodiment of the workspace, and the workspace adapted to be used in the present invention is not limited thereto. For instance, a unified script which is regarded as the intermediate language for implementing the workspace can be edited in advance so as to render a workspace built in a matterizer, information and/or tool. Furthermore, the workspace is not limited to a private workspace, but can be provided for cooperative work among multiple users at the same or different time according to practical needs. Furthermore, the workspace can be projected to any electronic device with computing capability by way of a workspace-projecting method so that a user may use the projected workspace on that electronic device.

In an embodiment, the workspace-projecting method includes acquiring a projectable space instance which is instantiated from a unified script through a URI (uniform resource identifier). The unified script is defined to configure a matterizer, information and/or tool to model a workspace, as described above, and the projectable space instance is used for building a projected workspace corresponding to the workspace to provide an interface for operating the matterizer, information and/or tool. The workspace-projecting method further includes using a projector to parse the projectable space instance and build a working environment to configure the matterizer, information and/or tool, in order to execute the projected workspace. Then the user may interact with the projected workspace.

In the workspace-projecting method, the projector can be acquired from a remote data station, a projectable space instance or a preloaded application program, and loaded to an engine where a compatible working environment is provided for executing the projector. The engine includes, but is not limited to, a JavaScript engine, a Windows application, and/or a Linux application program. Furthermore, the unified script can be declared by a DTD (Document Type Definition), an XML Schema, a structured language or a structured protocol, but is not limited thereto. The projectable space instance can be, but is not limited to, an object, an XML document, or an instance which is instantiated with the structured language or the structured protocol.

Figure 4:
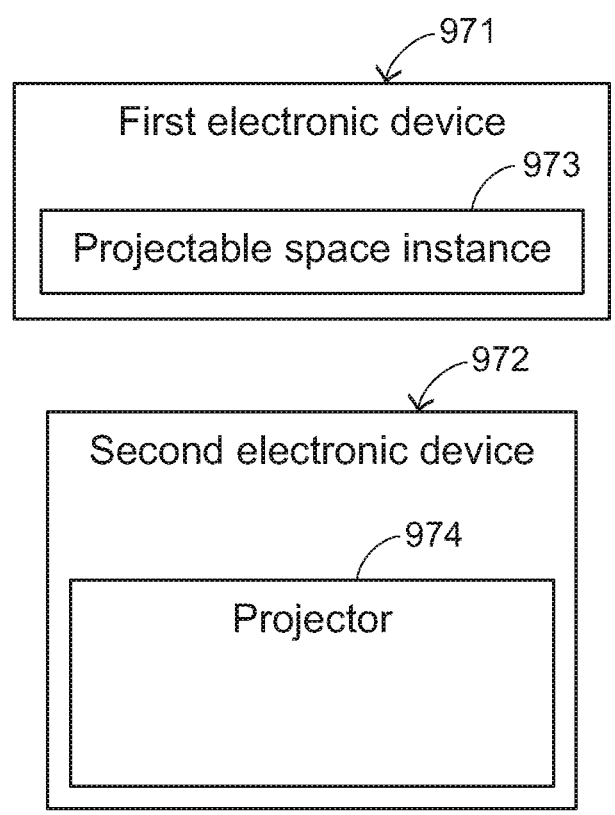
FIGS. 4, 5A and 5B are schematic diagrams exemplifying creation of a projected workspace, which is applicable to the present invention for controlling and managing an electronic device.
Figure 5A:
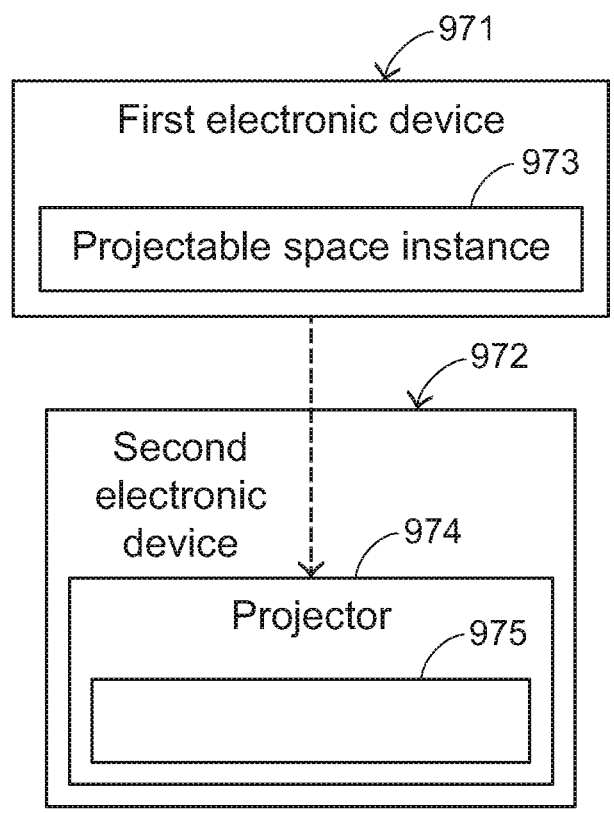
Figure 5B:
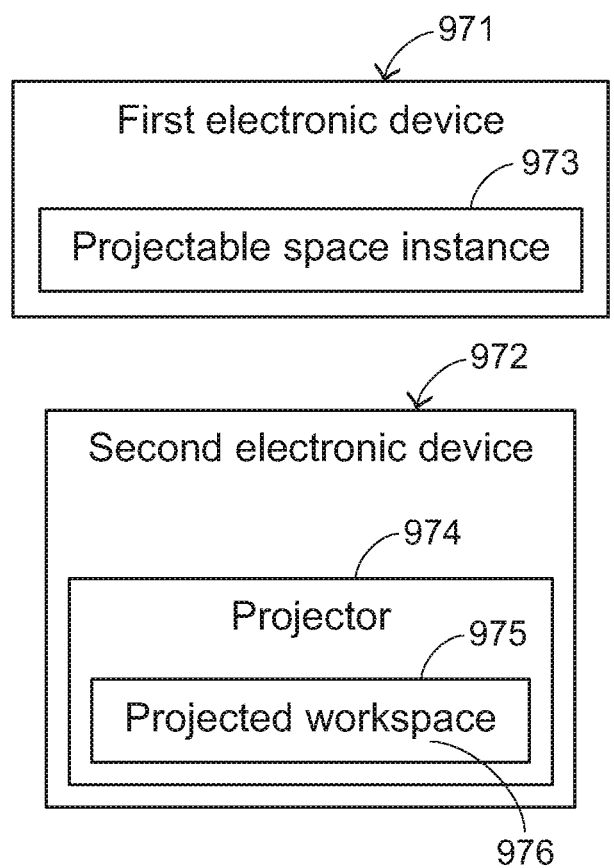
Figure 6:
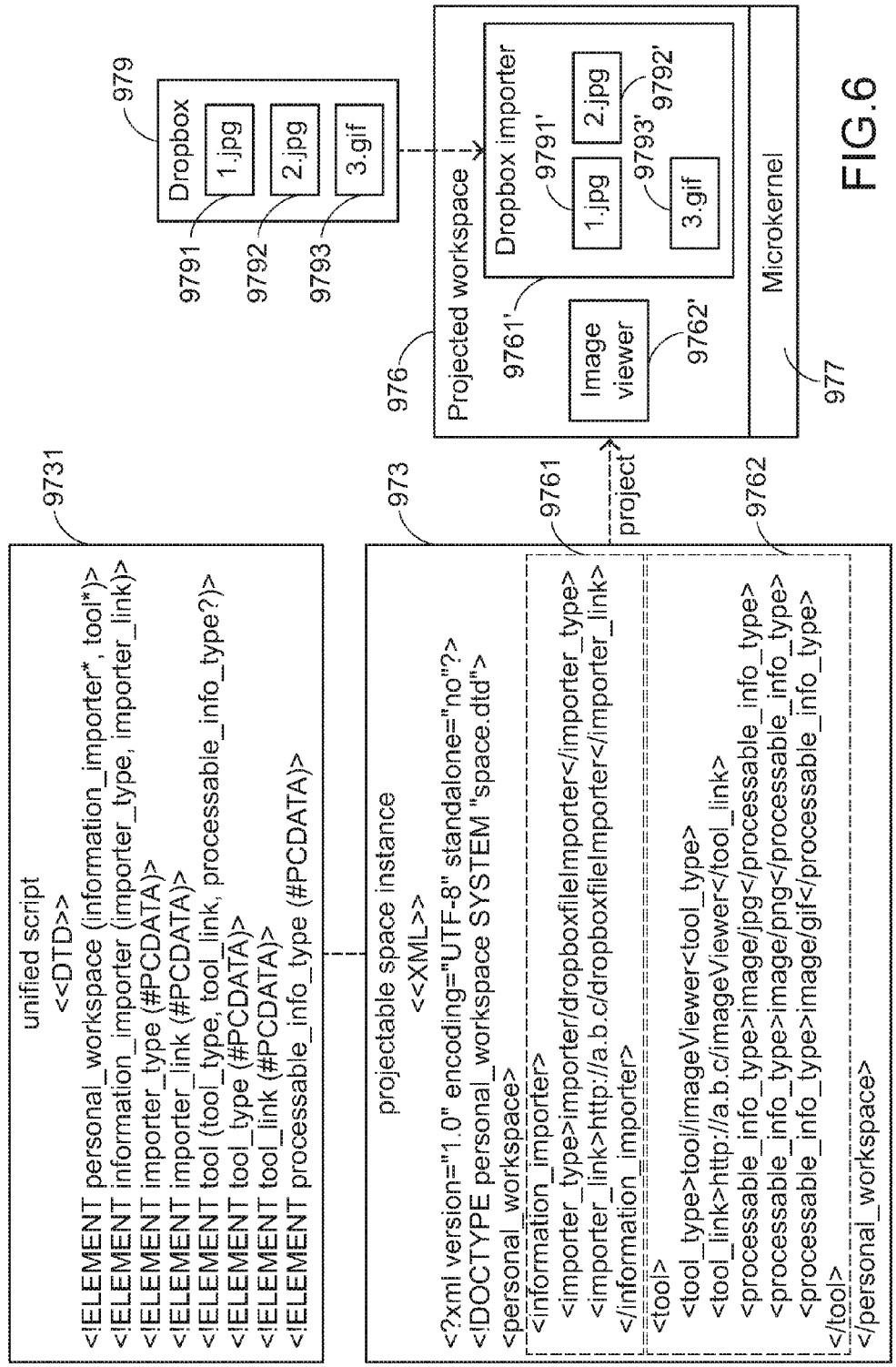
FIG. 6 is a schematic diagram exemplifying the relationship between a projectable space instance and a projected workspace applicable to the present invention for controlling and managing an electronic device.

Furthermore, the workspace-projecting method will be illustrated in more detail by way of some embodiments. Please refer to FIG. 4, FIG. 5A, FIG. 5B and FIG. 6. FIG. 4 schematically illustrates an initial state before the workspace-projecting method is performed. FIG. 5A and FIG. 5B schematically illustrates the progresses of the workspace-projecting method. FIG. 6 schematically shows the relationship between a projectable space instance as shown in FIG. 4 and a projected workspace as shown in FIG. 5B. As shown in FIG. 6, a first electronic device 971 and a second electronic device 972 can be interconnected to each other, for example, through the internet. Furthermore, the projectable space instance 973 is saved in the first electronic device 971, and a built-in projector 974 is saved in the second electronic device 972.

In this embodiment, a unified script 980 is declared by the DTD (Document Type Definition) for configuring at least one information importer, at least one unified information and/or at least one unified tool to model a workspace. The information importer is an embodiment of the matterizer. Moreover, the projectable space instance 973 is an object which is instantiated with XML. As shown in FIG. 6, the projectable space instance 973 is used for building the projected workspace 976 corresponding to the workspace. Besides, the information importer, the unified information and/or the unified tool is allowed to be added in or removed from the projectable space instance 973. The above-mentioned descriptions will be illustrated in more details as follows.

Furthermore, the projector 974 of the second electronic device 972 will establish a working environment 975 on the second electronic device 972 for executing the projected workspace 976, and the projector 974 provides a microkernel 977 (see FIG. 6) to the working environment 975 for equipping at least one information importer, at least one unified information and/or at least one unified tool which is/are going to be added to the projected workspace 976. When the second electronic device 972 acquires the projectable space instance 973 saved in the first electronic device 971 through a URI, the projector 974 of the second electronic device 972 starts to parse the projectable space instance 973, as shown in FIG. 8A. After the projectable space instance 973 is parsed by the projector 974, the projected workspace 976 is created in the working environment 975 according to parsed contents of the projectable space instance 973, as shown in FIG. 8B. Accordingly, a user of the second electronic device 972 can interact with the projected workspace 976 through the second electronic device 972 to perform related tasks.

Figure 7:
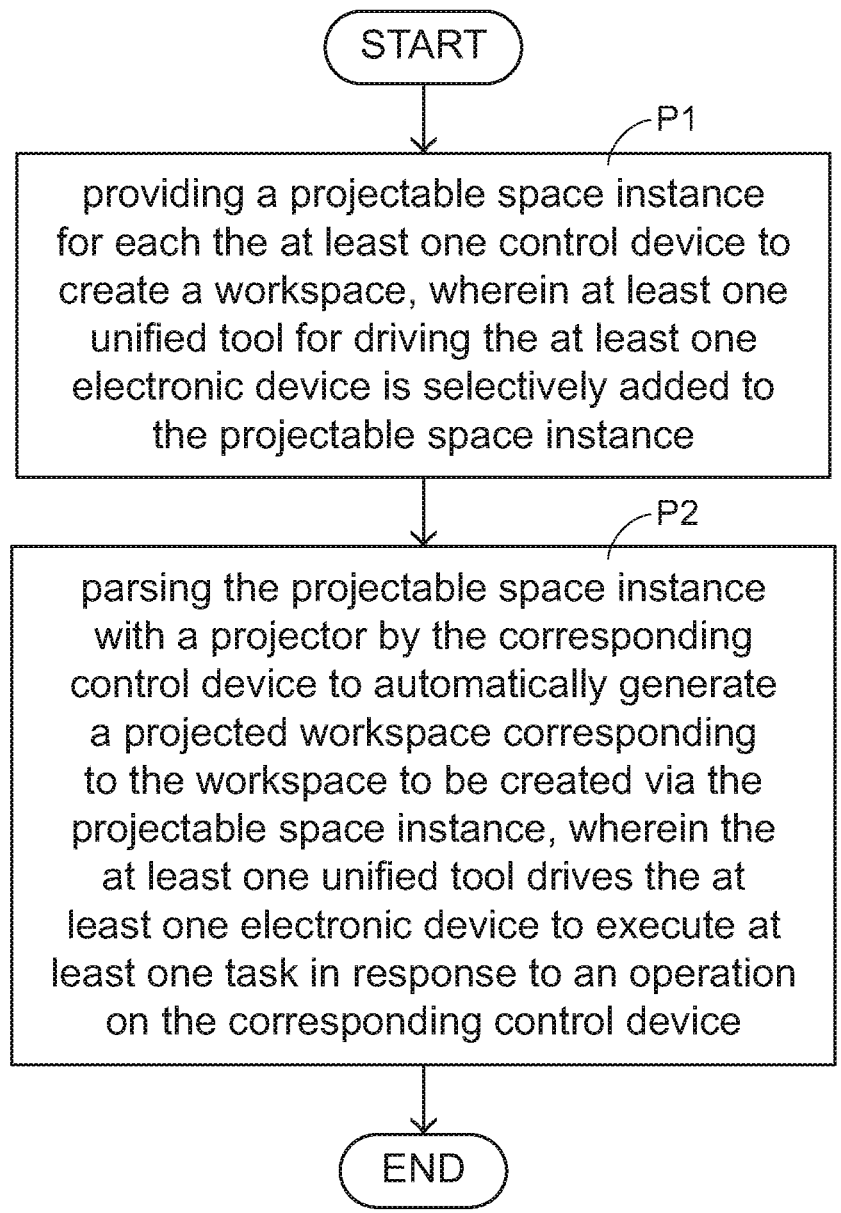
FIG. 7 is a flowchart illustrating a method of controlling and managing an electronic device according to the present invention.

The relationships between above mentioned unified script 980, the projectable space instance 973 and the projected workspace 976 will be illustrated in more detailed by way of a practical condition as shown in FIG. 7. As shown in FIG. 7, a workspace which can be projected and is capable of accessing jpg format image files and gif format image files saved in a specified internet space is created for making the image files visible to a user. In this example, the unified script 980 is declared by the Document Type Definition (DTD), and the projectable space instance 973 is instantiated with XML.

Moreover, the information importer and the unified tool will be added into the projectable space instance 973, and the information importer is used to import at least one unified information unit corresponding to original information into the projected workspace 976. In this example, the information importer is a Dropbox importer (the information of the Dropbox importer is exemplified in the dashed line frame 9761 of FIG. 6). The original information are jpg format image file 9791, jpg format image file 9792 and gif format image file 9793 stored in Dropbox 979, and the unified information units are unified jpg format image file 9791', unified jpg format image file 9792' and unified gif format image file 9793'. The unified tool is an image viewer (the information of the unified tool is exemplified in the dashed line frame 9762 of FIG. 6) used for accessing image files which are imported into the projected workspace 976.

As mentioned previously, the projected workspace 976 is created after the projectable space instance 973 is parsed by the projector 974 of the second electronic device 972. In this example, the Dropbox importer 9761' (corresponding to the dashed line frame 9761) and the image viewer 9762' (corresponding to the dashed line frame 9762) are configured in the projected workspace 976. The Dropbox importer 9761' unifies and imports the jpg format image file 9791, the jpg format image file 9792 and the gif format image file 9793 from Dropbox 979 into the projected workspace 976. Then the unified jpg format image file 9791', the unified jpg format image file 9792' and the unified gif format image file 9793' corresponding to the jpg format image file 9791, the jpg format image file 9792 and the gif format image file 9793, respectively, are present in the projected workspace 976. When the user of the second electronic device 972 manipulates any of the unified image files 9791', 9792' and 9793' by way of any suitable means, e.g. clicking on the icon representing one of the unified images files 9791', 9792' and 9793', or dragging and dropping the icon representing one of the image files 9791', 9792' and 9793' to the image viewer 9762', the image viewer 9762' will access contents of the corresponding unified image file 9791', 9792' or 9793' to present the unified image file 9791', 9792' or 9793' in front of the user. The information importer 9761' and the image viewer 9762' mentioned above may be equipped by the microkernel 977.

It is to be noted that the URI of the projectable space instance 973 may be a HTTP (hypertext transfer protocol) URI or a FTP (file transfer protocol) URI. When the first electronic device 971 and the second electronic device 972 are integrated into one device, the URI of the projectable space instance 973 can also be a local file URI. The URI of the projectable space instance 973 is not limited to the above-mentioned types. The projectable space instance 973 can be accessed by not only an original editor, but also an authorized user or an authorized electronic device. For instance, the authorized user may, but is not limited to, acquire the projectable space instance 973 through the URI by using an authorized user account and password.

A related art disclosed in patent application Ser. No. 14/577,772, entitled "Method of projecting a workspace and system using the same" and assigned to the same assignee, as well as the China Patent Application No. 201410814138.5, which claims the benefit of priority to the U.S. patent application Ser. Nos. 14/324,069, 14/325,466 and 14/577,772 and is entitled "Method of projecting a workspace and system using the same", are applicable to embodiments of the present invention. The disclosure of the co-pending patent applications are incorporated herein for reference.

It is to be noted that the workspace-projecting method described above is only one of the examples for projecting a workspace to any electronic device with computing capability. Those who are skilled in the art may make variations and modifications to the workspace-projecting method described above depending on practical requirements.

With the utilization of the above-mentioned or other related art, a method of controlling and managing an electronic device is developed according to the present invention. An objective of the control and management method according to the present invention is to make it possible for a user to control the same or different electronic devices with any control device linking to a network, e.g. the internet. Furthermore, after one simple configuring operation, more than one control device linking to the internet can share settings of control rule and control interface. The different electronic devices, for example, may be the same type of electronic devices manufactured by different manufacturers but exhibiting similar functions. They could also be different types of electronic devices manufactured by the same of different manufacturers and exhibiting different functions.

Hereinafter, a method of controlling and managing an electronic device according to the present invention will be described in more detail by way of embodiments with reference to accompanying drawings.

Please refer to FIG. 7, which is a flowchart illustrating a method of controlling and managing an electronic device according to the present invention. The control and management method includes: Step P1: providing a projectable space instance for each the at least one control device to create a workspace, wherein at least one unified tool for driving the at least one electronic device is selectively added to the projectable space instance; and Step P2: parsing the projectable space instance with a projector by the corresponding control device to automatically generate a projected workspace corresponding to the workspace to be created via the projectable space instance, wherein the at least one unified tool drives the at least one electronic device to execute at least one task in response to an operation on the corresponding control device.

The projectable space instance is configured, for example by a user, in accordance with a desired control and management design, including a control rule and/or a control interface, which will be illustrated in more detail later. The at least one control device may be selected from, for example but not limited to, a computer, a home appliance, a handheld electronic device, a wearable electronic device or a combination thereof.

Figure 9A:
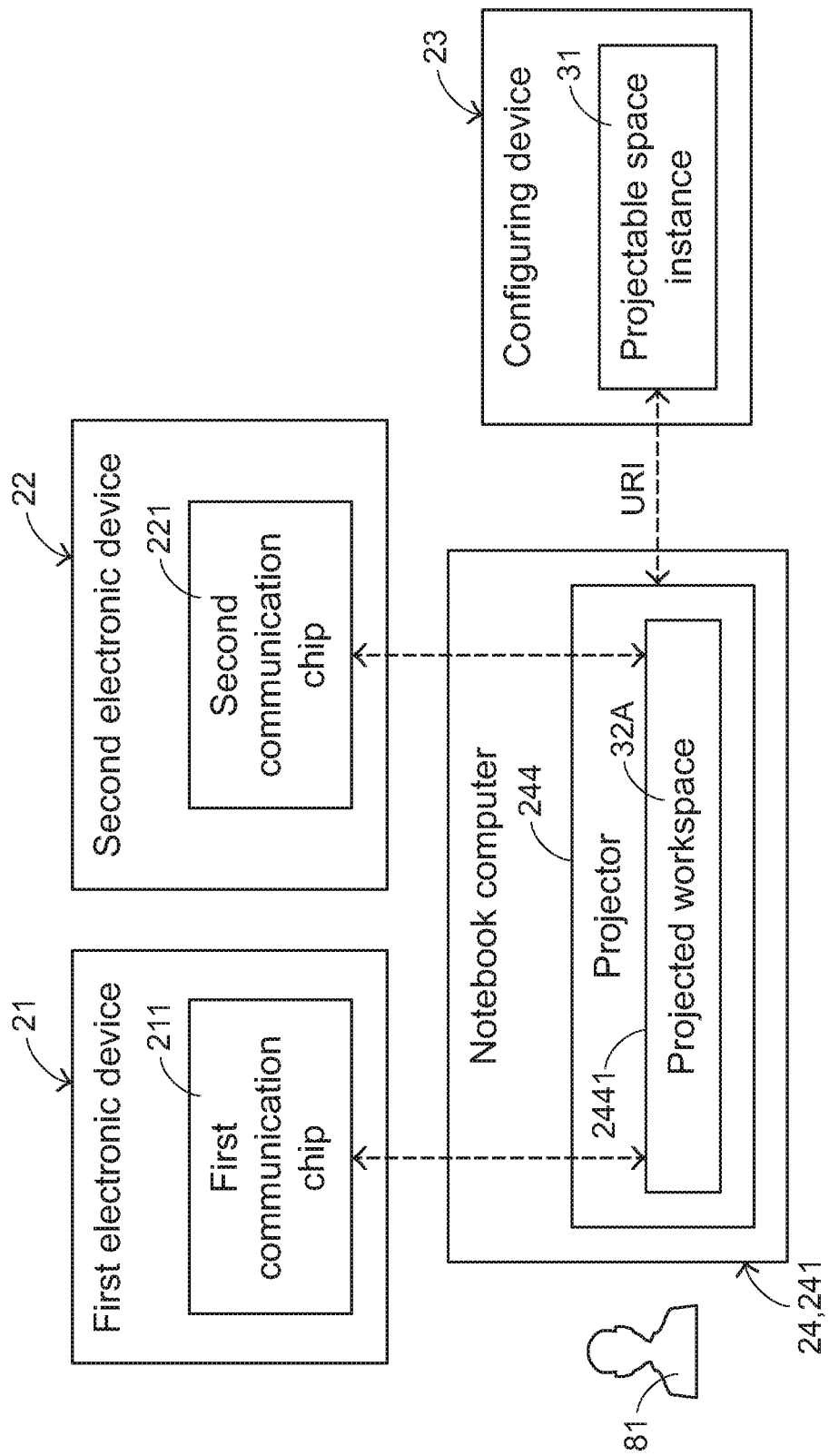
FIG. 9A is a scheme exemplifying operation of the control system of FIG. 8, wherein two electronic devices are controlled and managed with a notebook computer.
Figure 9B:
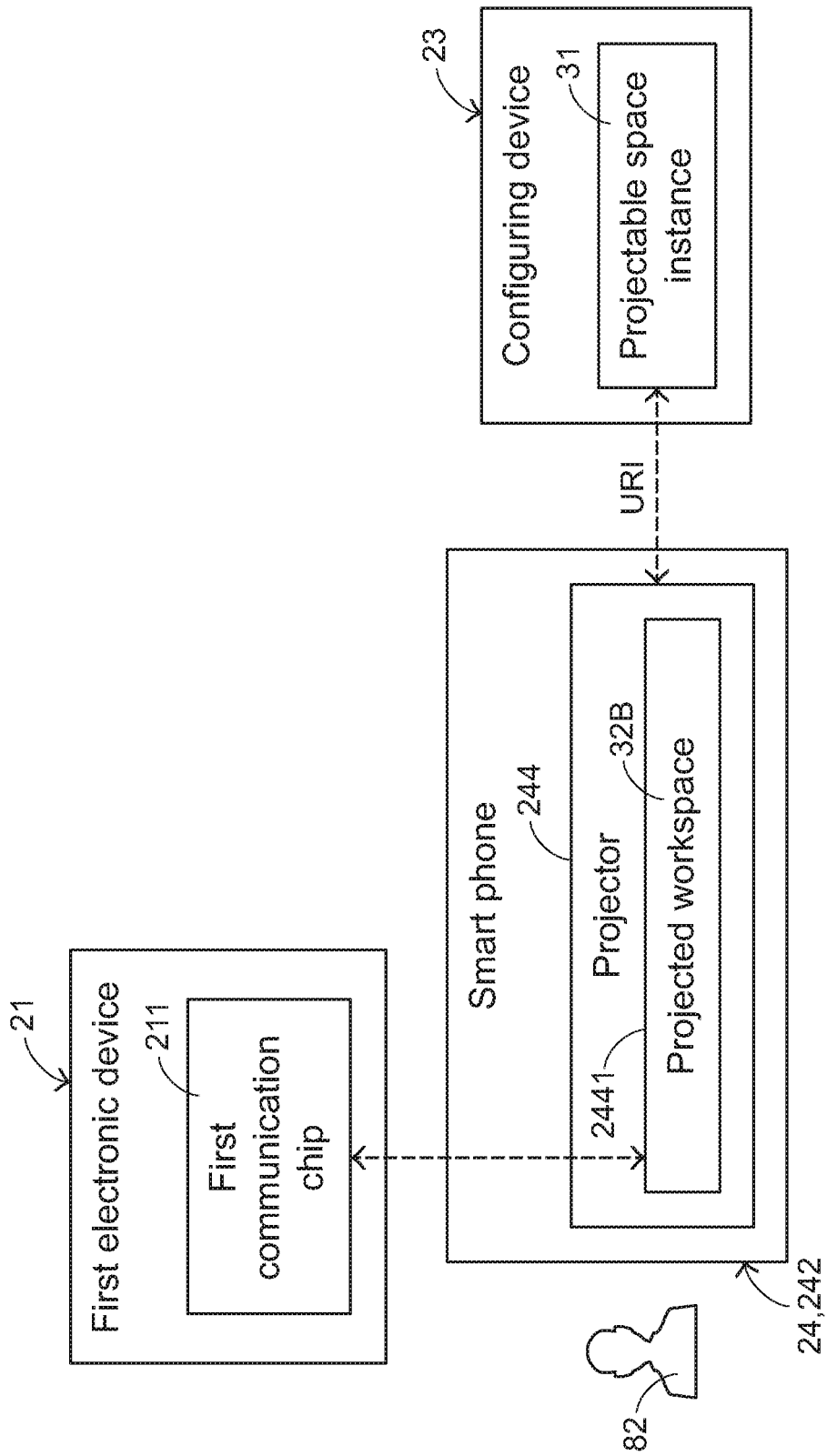
FIG. 9B is a scheme exemplifying operation of the control system of FIG. 8, wherein one electronic device is controlled and managed with a smart phone.
Figure 10A:
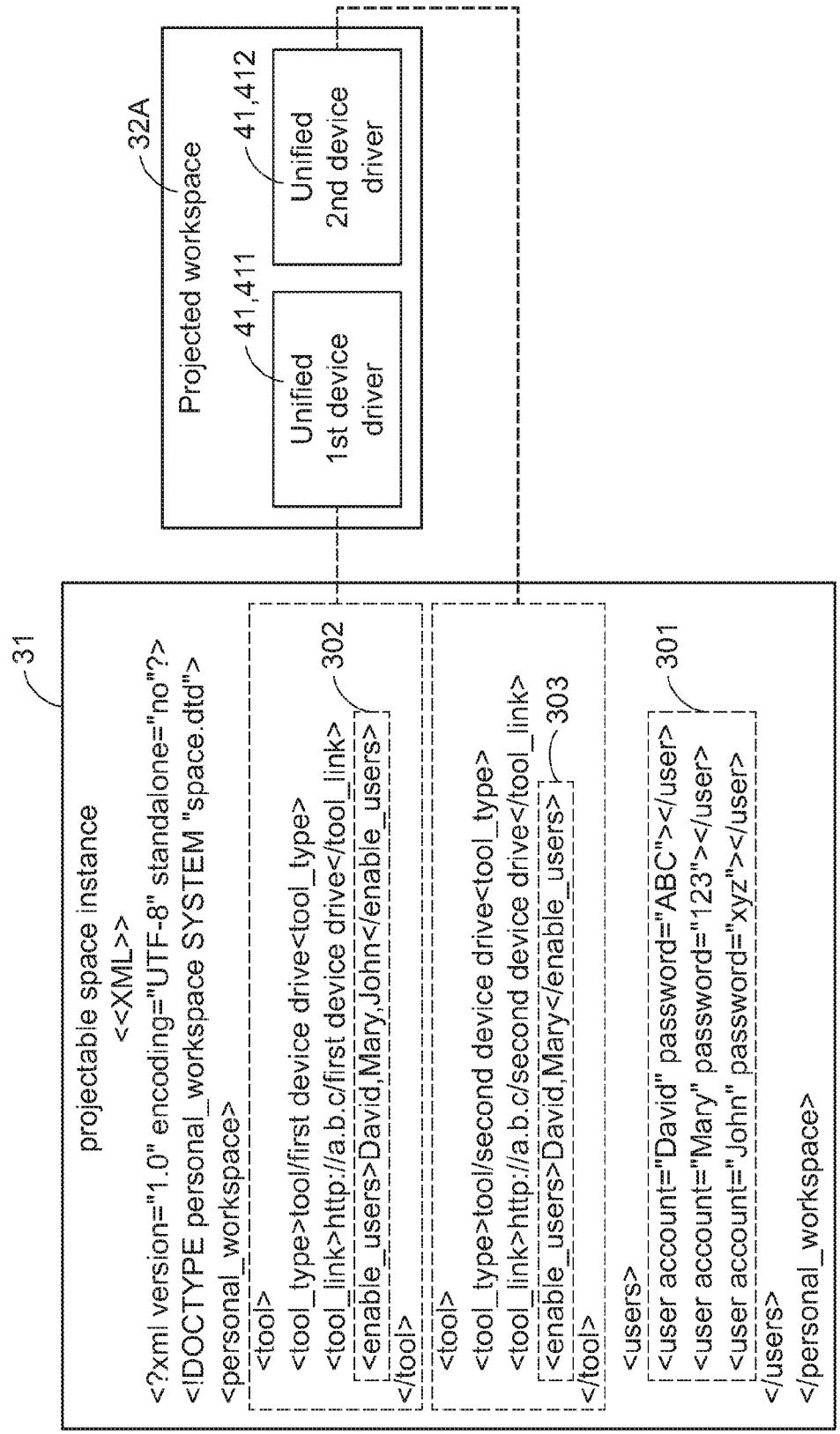
FIG. 10A is a schematic diagram illustrating the relationship between a projectable space instance and a projected workspace, associated with the operation as shown in FIG. 9A.
Figure 10B:
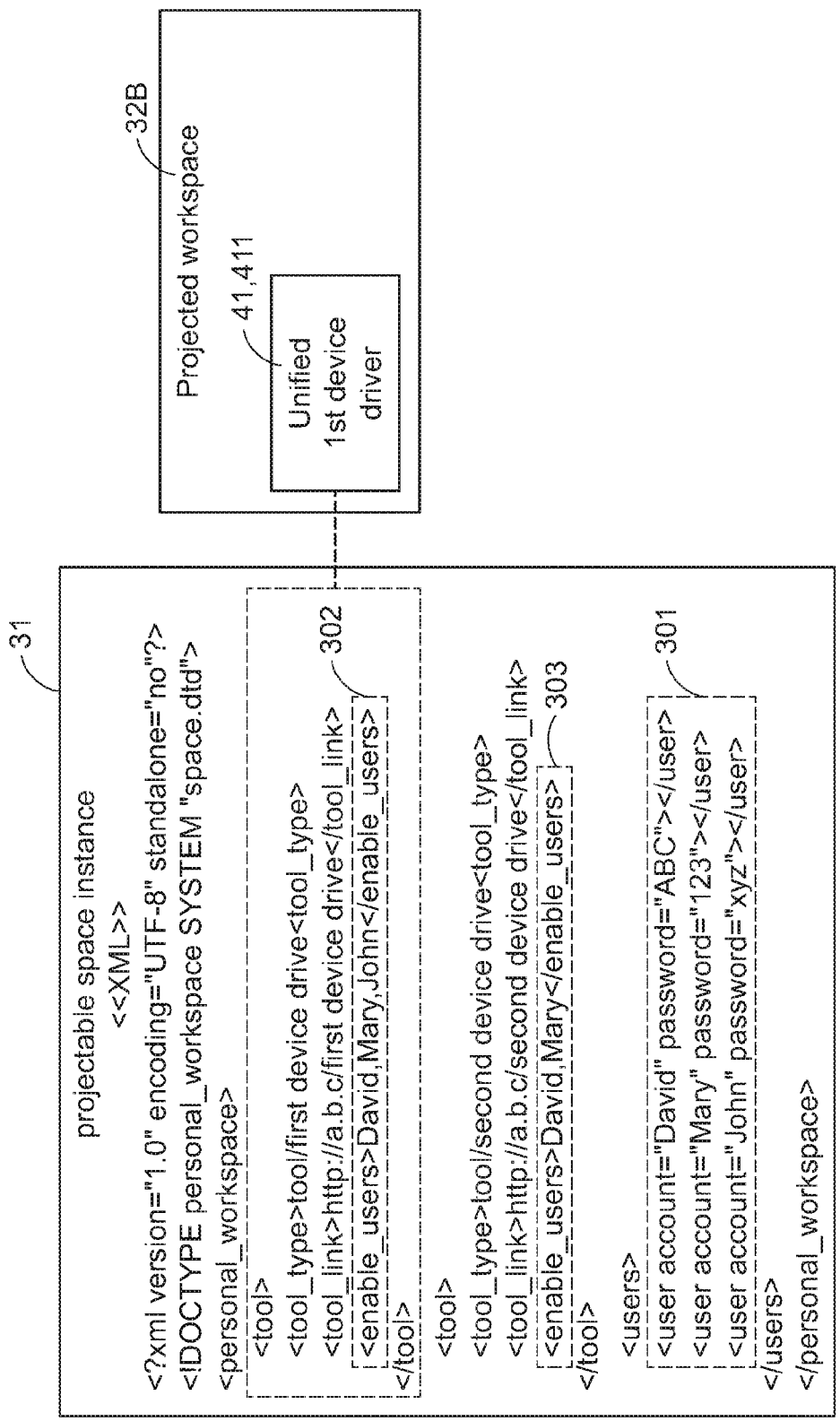
FIG. 10B is a schematic diagram illustrating the relationship between a projectable space instance and a projected workspace, associated with the operation as shown in FIG. 9B.
Figure 10C:
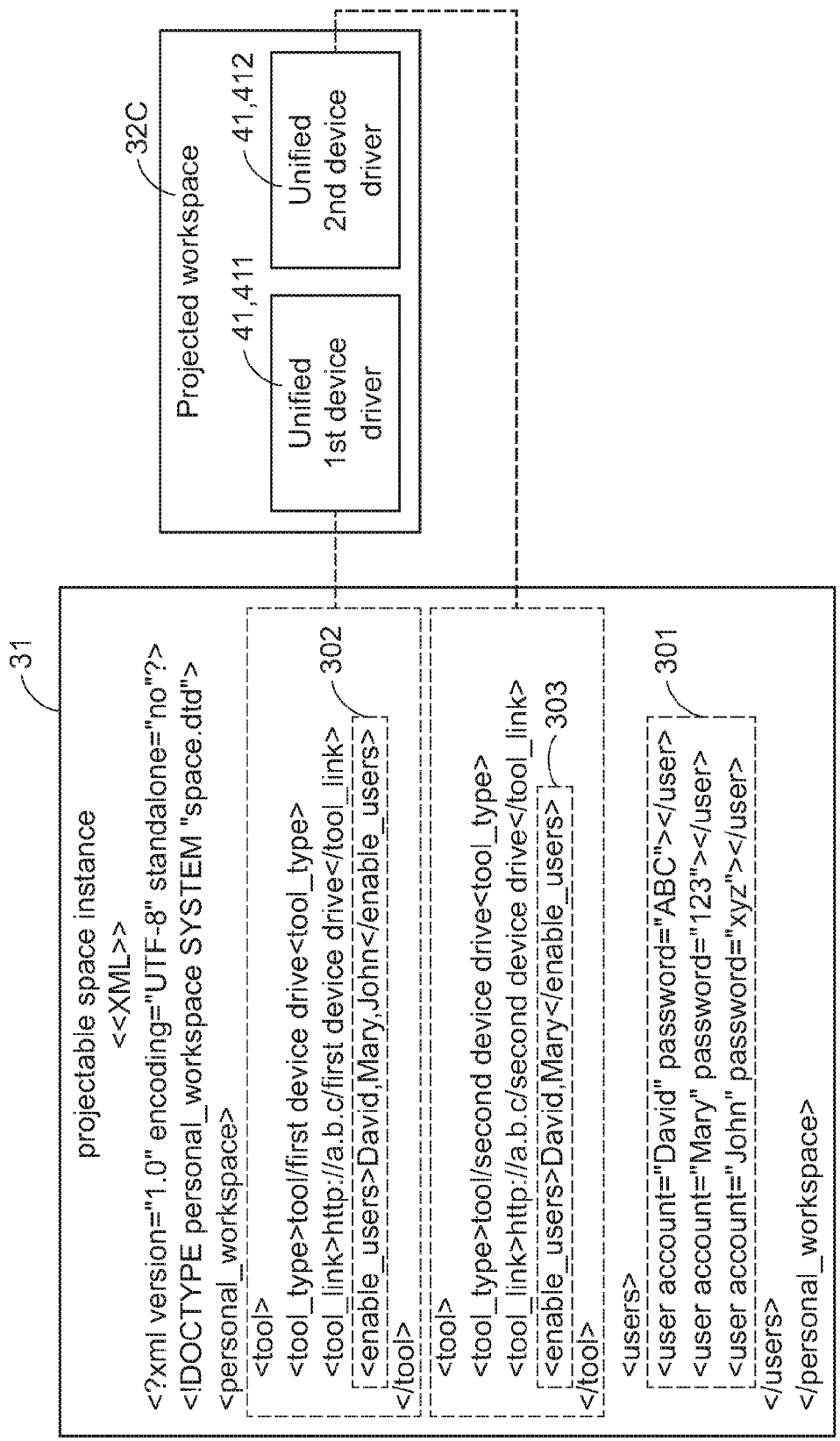
FIG. 10C is a schematic diagram illustrating the relationship between a projectable space instance and a projected workspace, associated with the operation as shown in FIG. 9C.

Please refer to FIG. 8 through FIG. 10C. FIG. 8 schematically illustrating an initial state of the control system before a projected workspace is built. FIGS. 9A-9C are schemes exemplifying operations of the control system of FIG. 8. Each of FIGS. 10A-10C is a schematic diagram illustrating the relationship between a projectable space instance and a projected workspace, associated with a corresponding one of the operations as shown in FIGS. 9A-9C.

A control system according to the present invention includes at least one electronic device; and at least one control device, each using a projector to parse a projectable space instance to build a projected workspace corresponding to a workspace to be created via the projectable space instance, wherein at least one unified tool for driving the at least one electronic device is selectively added to the projectable space instance, and the at least one unified tool drives the at least one electronic device to execute at least one task in response to an operation on the corresponding control device. In the non-limiting example as shown in FIG. 8, the control system 2 includes a first electronic device 21, a second electronic device 22, a configuring device 23, and a notebook computer 241, a smart phone 242 and a wearable electronic device 243 serving as the control devices 24, which are interconnected via a network, e.g. the internet. A first communication chip 211 developed based on a first communication protocol and a second communication chip 221 developed based on a second communication protocol are installed in the first electronic device 21 and the second electronic device 22, respectively. The first communication protocol is different from the second communication protocol. The control device 24 is, for example but not limited to, a computer, a home appliance, a handheld electronic device or a wearable electronic device. The first communication chip 211 is developed based on, for example but not limited to, AllJoyn open software architecture and the second communication chip 221 is developed based on, for example but not limited to, a communication protocol of DLNA.

For example, there are three users 81, 82 and 83 accessible to the control system 2, and conducting control and management of one or more electronic devices with the notebook computer 241, the smart phone 242 and the wearable electronic device 243, respectively. Initially, a projectable space instance 31 is installed in the configuring device 23, for example but not limited to, a computer, and the projectable space instance 31 is created and compiled according to practical needs of the users 81, 82 and 83. The users 81, 82 and 83, once authorized, may selectively add a plurality of unified tools 41 respectively corresponding to the first electronic device 21 and the second electronic device 22 to the projectable space instance 31 to be compiled. When the projectable space instance 31 is loaded into any of the control devices 24 via, for example but not limited to, a uniform resource identifier (URI), the corresponding control device 241, 242 or 243 parses the projectable space instance 31 and builds a projected workspace 32A, 32B or 32C accordingly. Then the projected workspace 32A, 32B or 32C can be executed by the corresponding control device 241, 242 or 243, whereby the users 81, 82 and 83 can adaptively control and manage the first electronic device 21 and the second electronic device 22 execute desired tasks.

In this embodiment, each of the notebook computer 241, the smart phone 242 and the wearable electronic device 243 has a projector 244 for building a working environment 2441 required for the operation of the projected workspace 32A, 32B or 32C in the control device 241, 242 or 243. The projector 241 also provides a microkernel 2412 corresponding to the workspace for equipping and launching the unified tools 41 compiled in the projectable space instance 31. When each of the notebook computer 241, the smart phone 242 and the wearable electronic device 243 loads the projectable space instance 31 thereinto from the configuring device 23, the projector 244 parses the projectable space instance 31, and then the projected workspace 32A, 32B or 32C is built in the working environment 2441 according to parsed contents of the projectable space instance 31. Accordingly, the users 81, 82 and 83 can control the first electronic device 21 and/or the second electronic device 22 to execute a task by way of respective control devices 241, 242 and 243. The projector 244 can be built in the control device 24. Alternatively, the projector 244 can also be loaded from an external storage device (not shown in the figures) via internet.

In this embodiment, the unified tools 41 includes a unified first device driver 411 and a unified second device driver 412 generated by unifying a first device driver and a second device driver respectively corresponding to the first electronic device 21 and the second electronic device 22, and the projectable space instance 31 is an object which is instantiated with XML. FIGS. 10A-10C schematically illustrate examples of the relationship between the compiled contents of the projectable space instance 31 and the unified first device driver 411 and/or the unified second device driver 412 in the projected workspaces 32A, 32B and 32C, respectively. The correspondence is indicated with dash lines. In this embodiment, the first device driver and the second device driver are developed by way of, for example but not limited to, software development kits (SDK) respectively corresponding to the first electronic device 21 and the second electronic device 22, and held in a specified storage device linkable to the internet.

Figure 11:
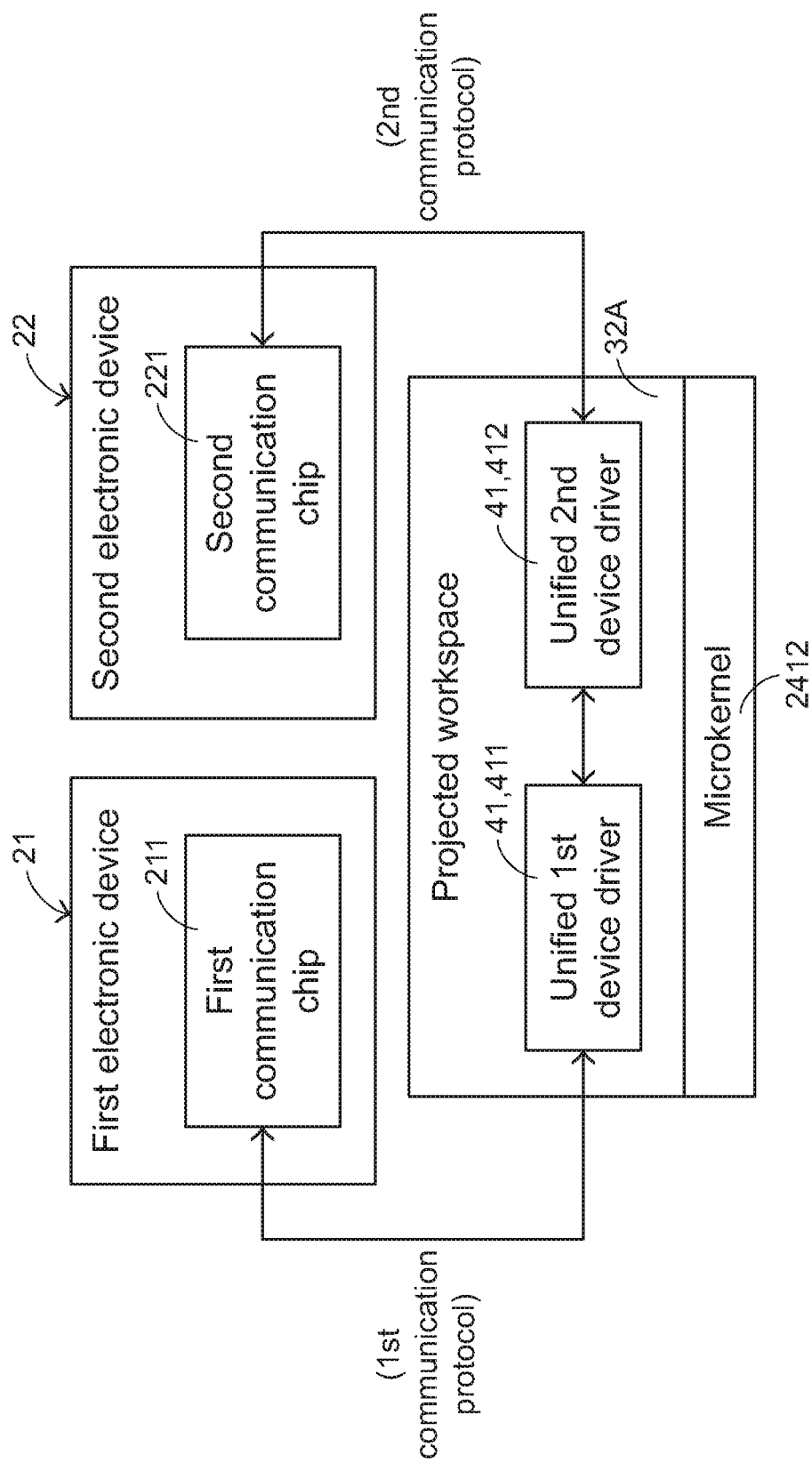
FIG. 11 is a scheme illustrating the interaction of the projected workspace with the first electronic device and the second electronic device, associated with the operation as shown in FIG. 9C.

Please refer to FIG. 11, which is a scheme illustrating the interaction of the projected workspace in the control device, e.g. the notebook computer shown in FIG. 9A, with the first electronic device and the second electronic device for control and management according to an embodiment of the present invention. In this embodiment, since the unified first device driver 411 and the unified second device driver 412 configured into the projected workspace 32A during the creation of the projected workspace 32A are generated by unifying the first device driver and the second device driver corresponding to the first electronic device 21 and the second electronic device 22, respectively, the unified first device driver 411, the unified second device driver 412 are compatible and communicable with one another. Therefore, the first communication chip 211 of the first electronic device 21 in communication with the unified first device driver 411 via the first communication protocol and the second communication chip 221 of the second electronic device 22 in communication with the unified second device driver 412 via the second communication protocol can interact with each other to execute a task. Likewise, the workspace 32B and the workspace 32C can interact with the first electronic device 21 and/or the second electronic device 22 in a similar way, which will not be redundantly described herein.

It is to be noted that an authorized user can compile the projectable space instance 31 to set respective control authorities of the users 81, 82 and 83. FIGS. 10A-10C show that the compiled contents of the projectable space instance 31 include identity information 301. Taking FIG. 10A for example, the identity information 301 shows that the users 81, 82 and 83 are named under accounts David, Mary and John, respectively, and the passwords corresponding to accounts David, Mary and John are ABC, 123 and xyz, respectively. Furthermore, the compiled contents of the projectable space instance 31 include authority information 302 and 303. The authority information 302 shows that all the three users 81, 82 and 83 under accounts David, Mary and John are valid users to control the first electronic device 21. In other words, during the projected workspaces 32A, 32B and 32C are built in the notebook computer 241, the smart phone 242 and the wearable electronic device 243, the unified first device driver 411 is configured into the projected workspaces 32A, 32B and 32C. Therefore, any of the users 81, 82 and 83 may operate his own control device 24 to control the first electronic device 21 to execute a task by correctly inputting the account and password. On the other hand, the authority information 303 shows that only users 81 and 82 under accounts David and Mary are valid users to control the second electronic device 22. In other words, during the projected workspaces 32A, 32B and 32C are built in the notebook computer 241, the smart phone 242 and the wearable electronic device 243, the unified second device driver 412 is configured only into the projected workspaces 32A and 32B, so only the users 81 and 82 can control the second electronic device 22 to execute a task by correctly inputting the account and password. Since the unified second device driver 412 is not configured into the workspace 32C, the user 83 cannot control the second electronic device 22 to execute a task with his own control device, i.e. the wearable electronic device 243.

The method of controlling and managing an electronic device will be described hereinafter with reference to a practical example. For example, the first electronic device 21 and the second electronic device 22 are two home appliances, e.g. a television and an air conditioner. The users 81, 82 and 83 are home members. The one or ones who are authorized can compile the projectable space instance 31 and adding the unified first device driver 411 corresponding to the first electronic device 21, and the unified second device driver 412 corresponding to the second electronic device 22 into the projectable space instance 31. By way of the one-time compiling operation, any of the authorized home members can load the projectable space instance 31 into his own control device to control the first electronic device 21 and/or the second electronic device 22. It is not necessary to waste time and laboring to set the control rule or control interface in his own control device.

It is understood that one or each home member may exclusively have more than one control device provided with a projectable space instance. The control devices are possibly placed at different locations or regions all over the house due to practical conditions. For example, the control devices may include, for example but not limited to, a tablet computer placed in the living room and a smart phone placed in the bedroom. Then the home member who would like to control television in the living room may use the tablet computer as a control device without the need to get the smart phone from the bedroom.

According to the above descriptions, it is understood that the present invention provides a method of controlling and managing an electronic device such as a home appliance or a plurality of home appliances adopting the same or different communication protocols or communication chips with a single control device. Furthermore, by way of a simple setting operation, more than one control devices can share a common control rule or control interface and can be provided for one or more users to control and manage the electronic device or devices. It would improve the convenience of our daily lives.

It is to be noted that the above-mentioned embodiments are only for illustration purpose, and can be varied or modified according to practical needs. For instance, the control device or devices and the configuring device can be integrated into one unit. Furthermore, in addition to a home appliance system, the method of controlling and managing an electronic device according to the present invention may also be used in a medical equipment system, a security control system, a fire-fighting control system or a transportation control system.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A method of controlling and managing an electronic device, executed by at least one control device to control and manage at least one electronic device, the method comprising:
   providing a projectable space instance for the at least one control device to create a workspace, wherein at least one unified tool for driving the at least one electronic device is selectively added to the projectable space instance; and
   parsing the projectable space instance with a projector by the at least one control device to automatically generate a projected workspace corresponding to the workspace to be created via the projectable space instance, wherein the at least one unified tool drives the at least one electronic device to execute at least one task in response to an operation on the at least one control device, wherein the at least one unified tool includes a plurality of unified device drivers generated by unifying a plurality of device drivers for driving a plurality of electronic devices, respectively, and wherein the plurality of device drivers are configured in the projected workspace corresponding to the workspace after being unified, so as to be compatible with one another.

2. The method according to claim 1, wherein the at least one device driver is developed by way of a software development kit (SDK) corresponding to the at least one electronic device.

3. The method according to claim 1, for controlling and managing a home appliance system, a medical equipment system, a security control system, a fire-fighting control system or a transportation control system.

4. The method according to claim 1, wherein the projectable space instance is loaded via a uniform resource identifier (URI) to be provided for the at least one control device.

5. The method according to claim 1, wherein the at least one control device is selected from a computer, a home appliance, a handheld electronic device, a wearable electronic device or a combination thereof.

6. The method according to claim 1, wherein one of the at least one control device controls and manages at least two different types of electronic devices.

7. The method according to claim 6, wherein the at least two different types of electronic devices are manufactured by different manufacturers, exhibit different functions, or are manufactured by different manufacturers and exhibit different functions.

8. The method according to claim 1, wherein the projectable space instance is an object, an XML (extensible markup language) document, or an instance which is instantiated with a structured language or a structured protocol.

9. A control system, comprising:
   at least one electronic device; and
   at least one control device, each control device using a projector to parse a projectable space instance to automatically build a projected workspace corresponding to a workspace to be created via the projectable space instance, wherein at least one unified tool for driving the at least one electronic device is selectively added to the projectable space instance, and the at least one unified tool drives the at least one electronic device to execute at least one task in response to an operation on the at least one control device, wherein the at least one unified tool includes a plurality of unified device drivers generated by unifying a plurality of device drivers for driving a plurality of electronic devices, respectively, and wherein the plurality of device drivers are configured in the projected workspace corresponding to the workspace after being unified, so as to be compatible with one another.

10. The control system according to claim 9, wherein the at least one device driver is developed by way of a software development kit (SDK) corresponding to the at least one electronic device.

11. The control system according to claim 9, for controlling and managing a home appliance system, a medical equipment system, a security control system, a fire-fighting control system or a transportation control system.

12. The control system according to claim 9, wherein the projectable space instance is loaded via a uniform resource identifier (URI) to be provided for the at least one control device.

13. The control system according to claim 9, wherein the at least one control device is selected from a computer, a home appliance, a handheld electronic device, a wearable electronic device or a combination thereof.

14. The control system according to claim 9, wherein one of the at least one control device controls and manages at least two different types of electronic devices.

15. The control system according to claim 9, wherein the projector is built in the at least one control device, or loaded to the at least one control device.

16. The control system according to claim 9, wherein the projectable space instance is an object, an XML (extensible markup language) document, or an instance which is instantiated with a structured language or a structured protocol.

* * * * *